(12) United States Patent
Shibata

(10) Patent No.: US 7,075,861 B2
(45) Date of Patent: Jul. 11, 2006

(54) REPRODUCTION APPARATUS CAPABLE OF SELECTING PIECES OF INFORMATION FOR REPRODUCING

(75) Inventor: Kazuyoshi Shibata, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 65 days.

(21) Appl. No.: 10/341,438

(22) Filed: Jan. 14, 2003

(65) Prior Publication Data

US 2003/0137904 A1    Jul. 24, 2003

(30) Foreign Application Priority Data

Jan. 18, 2002   (JP) .................... 2002-000170 U

(51) Int. Cl.
*G11B 21/08*   (2006.01)
(52) U.S. Cl. .................................. 369/30.08
(58) Field of Classification Search ............ 369/30.09, 369/30.08, 30.07, 30.18, 30.27, 33.01, 30.26, 369/32.01, 6, 7; 386/52, 68, 95, 125
See application file for complete search history.

(56) References Cited

U.S. PATENT DOCUMENTS

| | | | | |
|---|---|---|---|---|
| 4,779,252 A | * | 10/1988 | Custers et al. ........... | 369/30.27 |
| 4,787,073 A | * | 11/1988 | Masaki .................... | 369/30.27 |
| 4,949,322 A | * | 8/1990 | Kimura et al. ........... | 369/30.27 |
| 5,051,971 A | * | 9/1991 | Yamagishi et al. ...... | 369/30.09 |
| 5,109,365 A | * | 4/1992 | Watanabe et al. ......... | 369/30.04 |
| 5,343,456 A | * | 8/1994 | Maeda ..................... | 369/30.23 |
| 5,408,448 A | * | 4/1995 | Carman .................... | 369/30.09 |
| 5,544,130 A | * | 8/1996 | Mizuno et al. ................ | 369/1 |
| 5,867,457 A | * | 2/1999 | Parvulescu et al. ...... | 369/30.06 |
| 5,986,979 A | * | 11/1999 | Bickford et al. ......... | 369/30.09 |
| 6,320,827 B1 | * | 11/2001 | Otsuka .................... | 369/30.06 |
| 6,351,442 B1 | * | 2/2002 | Tagawa et al. .......... | 369/275.3 |

FOREIGN PATENT DOCUMENTS

| | | |
|---|---|---|
| JP | 60-146989 U | 9/1985 |
| JP | 11-184883 | 7/1999 |
| JP | 2000-76834 | 3/2000 |
| JP | 2001-118364 | 4/2001 |

\* cited by examiner

*Primary Examiner*—Tan Dinh
(74) *Attorney, Agent, or Firm*—Morgan, Lewis & Bockius LLP

(57) ABSTRACT

An information reproducing apparatus for reproducing information recorded on a record medium. One of reproduce modes of reproducing information recorded on a record medium is selected. A reproduce program for selecting pieces of information recorded on the record medium on a random basis without duplication based on the selected reproduce mode and indicating the reproduce order of the selected pieces of information is prepared. The pieces of information recorded on the record medium are reproduced according to the reproduce order of the prepared reproduce program.

4 Claims, 10 Drawing Sheets

FIG. 5A

```
NUMBER-OF-PIECES-OF-MUSIC
SPECIFICATION RANDOM REPRODUCE               ~30a 10  8  12  7  4  11

27 MIN 21 SEC

[DETERMINE]    CORRECT     RETURN
```

FIG. 5B

```
NUMBER-OF-PIECES-OF-MUSIC
SPECIFICATION RANDOM REPRODUCE               ~30a 10  8  [12]  7  4  11

27 MIN 21 SEC

DETERMINE    [CORRECT]    RETURN
```

FIG. 5C

```
NUMBER-OF-PIECES-OF-MUSIC
SPECIFICATION RANDOM REPRODUCE               ~30a 10  8  [3]  7  4  11

28 MIN 13 SEC

[DETERMINE]    CORRECT     RETURN
```

FIG. 6A

```
TIME SPECIFICATION RANDOM REPRODUCE          ~30a 2  5  8  7  3  12
       9
              29 MIN 56 SEC

|DETERMINE|    CORRECT     RETURN
```

FIG. 6B

```
TIME SPECIFICATION RANDOM REPRODUCE          ~30a 2  5 |8| 7  3  12
       9
              29 MIN 56 SEC

DETERMINE   |CORRECT|    RETURN
```

FIG. 6C

```
TIME SPECIFICATION RANDOM REPRODUCE          ~30a 2  5 |10| 7  3  12
       9
              30 MIN 36 SEC

|DETERMINE|    CORRECT     RETURN
```

REPRODUCTION APPARATUS CAPABLE OF SELECTING PIECES OF INFORMATION FOR REPRODUCING

The present disclosure relates to the subject matter contained in Japanese Utility Model Application No. 2002-000170 filed Jan. 18, 2002, which is incorporated herein by reference in its entirety.

BACKGROUND OF THE INVENTION

1. Field of the Invention

This invention relates to an information reproducing apparatus for reproducing information recorded on a record medium such as a compact disk (CD), and in particular to an information reproducing apparatus for selecting and reproducing information recorded on a record medium based on a specified reproduce mode.

2. Description of the Related Art

In a related art, for example, as described in JP-A-11-184883, a plurality of search elements such as musical score information of a melody, a rhythm, etc., and bibliographic information of a composer, a songwriter, a part of words etc., are entered in order. Then, a search is made for one or more candidate pieces of music according to a search method proper to the information based on the valid entry in the entered search elements, and the found piece of music is reproduced.

In another related art, as described in JP-A-2001-118364, some of pieces of music or some of partitions recorded on a record medium are specified, an order pattern indicating the reproduce order is prepared, and the information recorded in some of pieces of music specified or some of partitions specified is reproduced according to the reproduce order indicated by the prepared order pattern.

In the former related art, a plurality of search elements such as musical score information of a melody, a rhythm, etc., and bibliographic information of a composer, a songwriter, a part of words etc., are entered in order, and then a search is made for one or more candidate pieces of music according to a search method proper to the information based on the valid entry in the entered search elements, and the found piece of music can be reproduced. However, it is impossible to automatically select and reproduce a piece of music recorded on a record medium based on the user-specified reproduce mode without searching for music recorded on the record medium based on the entered search elements.

In the latter related art, some of pieces of music or some of partitions recorded on a record medium are specified, an order pattern indicating the reproduce order is prepared, and the information recorded in some of pieces of music specified or some of partitions specified can be reproduced according to the reproduce order indicated by the prepared order pattern. However, it is impossible to automatically select and reproduce a piece of music recorded on a record medium based on the user-specified reproduce mode without specifying a part of one of a plurality of pieces of music or a partition unit.

SUMMARY OF THE INVENTION

It is therefore an object of the invention to provide an information reproducing apparatus capable of automatically selecting information recorded on a record medium based on are produce mode selected by the user and reproducing the selected information.

According to the invention, there is provided an information reproducing apparatus for reproducing information recorded on a record medium, the information reproducing apparatus comprising: reproduce mode selection means for selecting one of preset reproduce modes; reproduce program preparation means for preparing a reproduce program for selecting pieces of information recorded on the record medium on a random basis without duplication based on the reproduce mode selected through the reproduce mode selection means and indicating the reproduce order of the selected pieces of information; and reproduce means for reproducing the pieces of information recorded on the record medium according to the reproduce order of the reproduce program prepared by the reproduce program preparation means.

The information reproducing apparatus further comprises: display means for displaying the reproduce program prepared by the reproduce program preparation means on a screen of a monitor; and reproduce program correction means for indicating information of the reproduce program displayed on the screen of the monitor by the display means and correcting information selected by the reproduce program preparation means for correcting the reproduce program prepared by the reproduce program preparation means.

The reproduce mode selection means may select a reproduce mode of selecting all pieces of information recorded on the record medium on a random basis without duplication and reproducing all pieces of information selected.

The reproduce mode selection means may select a reproduce mode of specifying the number of pieces of information to be reproduced, selecting as many pieces of information as the specified number of pieces of information on a random basis with out duplication from among the pieces of information recorded on the record medium, and reproducing the pieces of information selected.

The reproduce mode selection means may select a reproduce mode of specifying reproduce time to reproduce information, selecting pieces of information reproduced within the specified reproduce time on a random basis without duplication from among the pieces of information recorded on the record medium, and reproducing the pieces of information selected.

According to the described configuration, the information recorded on the record medium can be automatically selected based on the reproduce mode selected by the user and the selected information can be reproduced.

BRIEF DESCRIPTION OF THE DRAWINGS

FIGS. 5A to 5C are schematic representations to show the operation of number-of-pieces-of-music specification random reproduce of the information reproducing apparatus;

FIGS. 6A to 6C are schematic representations to show the operation of time specification random reproduce of the information reproducing apparatus;

DETAILED DESCRIPTION OF THE PREFERRED EMBODIMENTS

Figure 1:
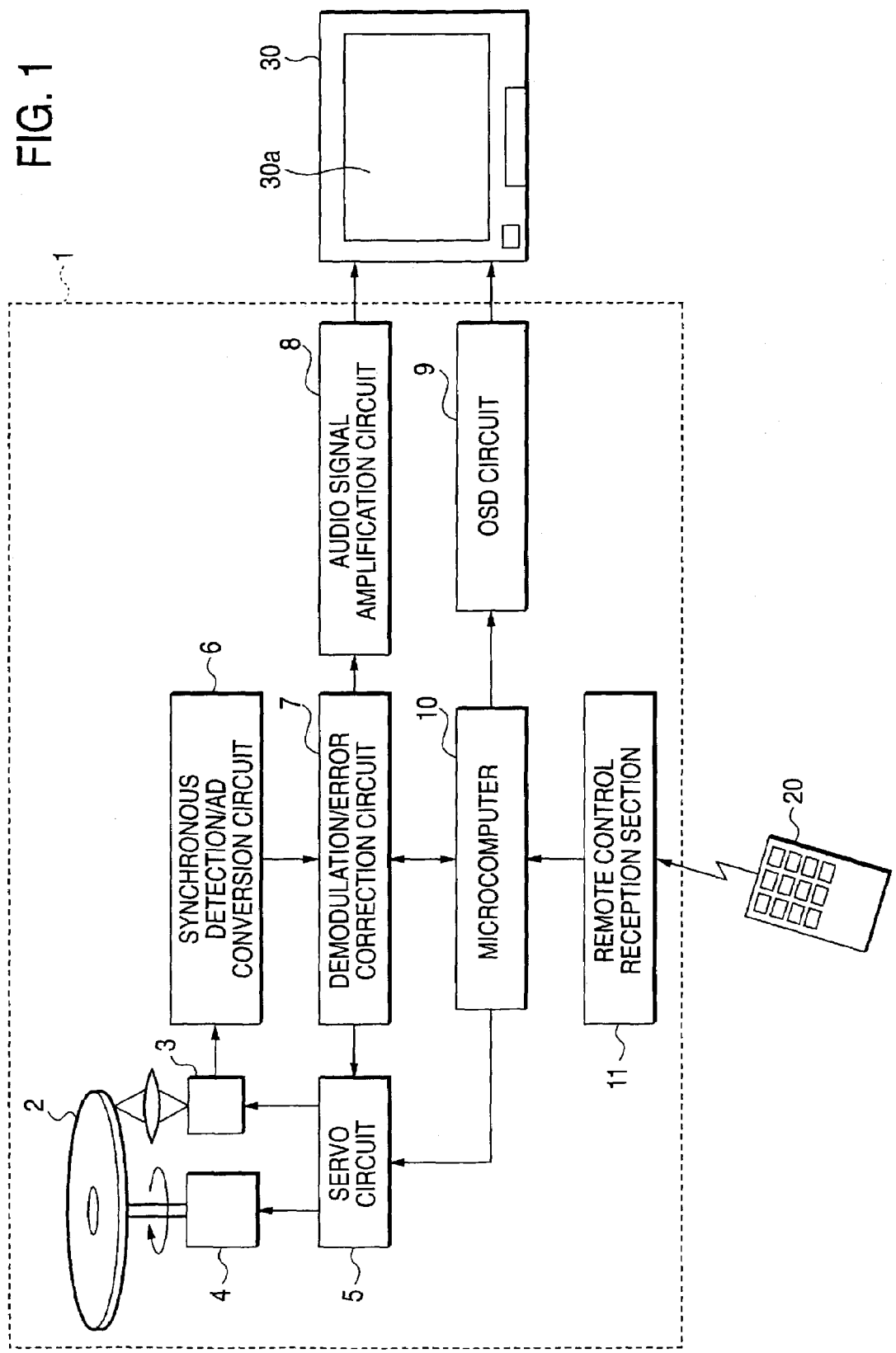
FIG. 1 is a block diagram to show the configuration of an information reproducing apparatus according to an embodiment of the invention.
Figure 2:
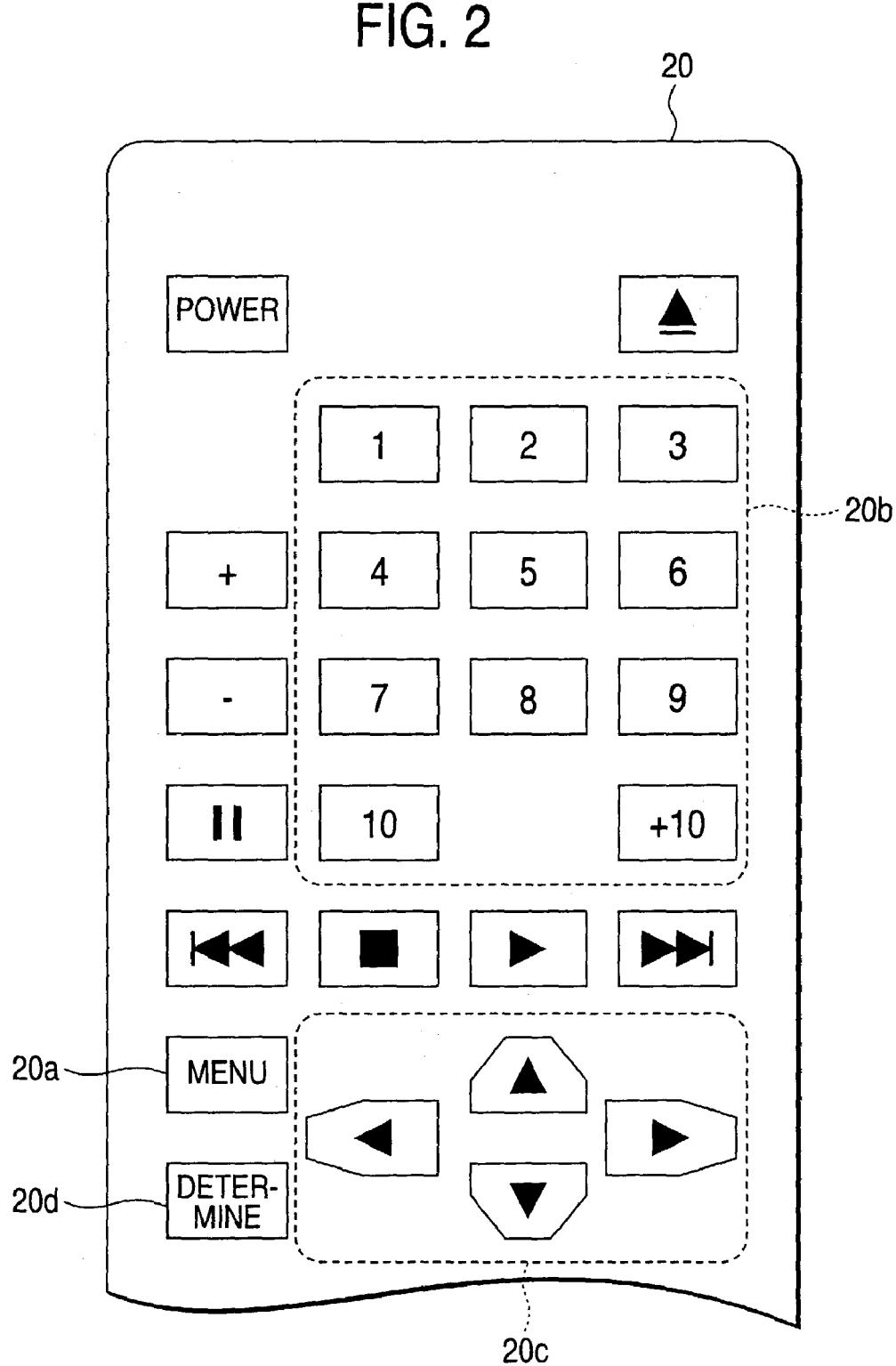
FIG. 2 is a schematic representation to show a remote control of the information reproducing apparatus.

Referring now to the accompanying drawings, there is shown a preferred embodiment of the invention. FIG. 1 is a block diagram to show the configuration of an information reproducing apparatus according to an embodiment of the invention. FIG. 2 is a schematic representation to show a remote control of the information reproducing apparatus. FIGS. 3A to 6C are schematic representations to show the operation of the information reproducing apparatus. FIGS. 7 to 10 are flowcharts to show the operation of the information reproducing apparatus.

An information reproducing apparatus 1 will be discussed with reference to the schematic representation of FIG. 2 to show a remote control 20 of the information reproducing apparatus based on the block diagram of FIG. 1 to show the configuration of the information reproducing apparatus.

The information reproducing apparatus 1 comprises an optical pickup 3 for optically reading an audio signal of a piece of music of information recorded on an optical disk 2, a servo circuit 5 for performing focus control and tracking control of the optical pickup 3 and performing CLV (Constant Linear Velocity) rotation control of a spindle motor 4 for rotating the optical disk 2, a synchronous detection/AD (analog-digital) conversion circuit 6 for synchronously detecting the audio signal optically read by the optical pickup 3 based on a reference clock and converting the analog signal into a digital signal, a demodulation/error correction circuit 7 for demodulating the audio signal converted into the digital signal by the synchronous detection/AD (analog-digital) conversion circuit 6 and correcting an error of the data of the audio signal optically read by the optical pickup 3. The information reproducing apparatus 1 further comprises an audio signal amplification circuit 8 for decoding the audio signal whose data error is corrected by the demodulation/error correction circuit 7 into an analog signal, amplifying the audio signal converted into the analog signal, and outputting the audio signal to a monitor 30, an OSD (On-Screen Character Display) circuit 9 for coding a text information signal into a video signal conforming to a predetermined signal system, for example, a video signal of NTSC (National Television System Committee) and outputting the video signal to the monitor 30, and a microcomputer 10 for receiving a command signal sent from the remote control 20 by a remote control reception section 11, sending a control signal to the servo circuit 5 and the OSD circuit 9, and controlling the whole system of the information reproducing apparatus 1.

As shown in FIG. 2, the remote control 20 is provided with various operation keys such as a menu key 20a for displaying a menu screen for setting various modes of the information reproducing apparatus 1 on a screen 30a of the monitor 30, numeric ten keys 20b for entering a numeric value of a title number of a piece of music, etc., cursor keys 20c for indicating selection items displayed on the screen 30a of the monitor 30, and a determination key 20d for determining the selection of the selection item indicated by operating the cursor keys 20c. The user can operate the operation keys to operate the information reproducing apparatus 1 as he or she desires.

The operation of the described information reproducing apparatus 1 will be discussed with reference to the schematic representations of FIGS. 3A to 6C to show the operation of the information reproducing apparatus.

Figure 3A:
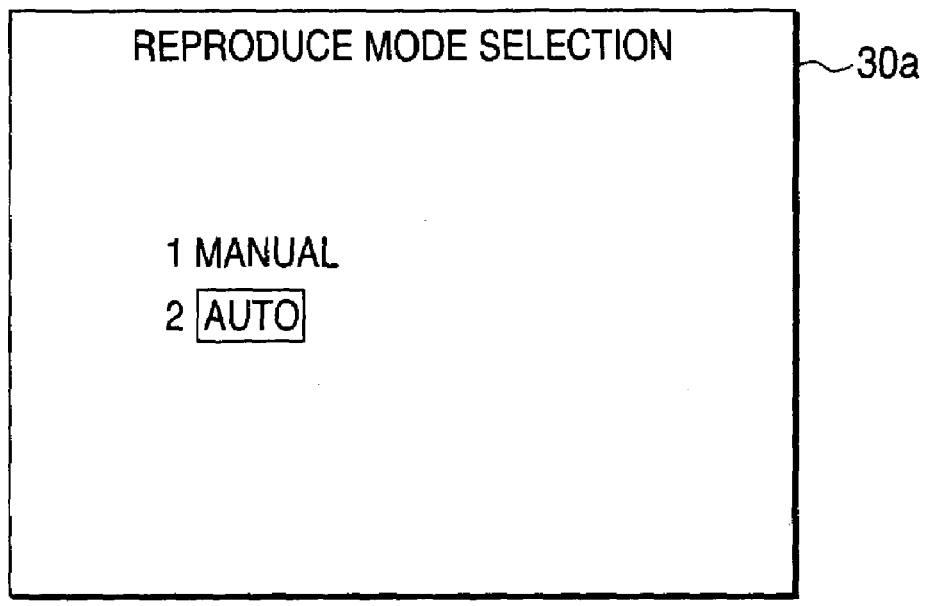
FIGS. 3A and 3B are schematic representations to show the operation of reproduce mode selection of the information reproducing apparatus.

To begin with, the operation will be discussed based on the schematic representations of FIGS. 3A to 3C to show the operation of reproduce mode selection of the information reproducing apparatus.

When the user operates the menu key 20a of the remote control 20, a menu screen is displayed on the screen 30a of the monitor 30. When the user selects REPRODUCE MODE SELECTION on the displayed monitor screen (not shown), a REPRODUCE MODE SELECTION screen for setting a reproduce mode for selecting the piece of music to be reproduced is displayed on the screen 30a of the monitor 30 as shown in FIG. 3A.

When the user operates the cursor key 20c of the remote control 20 to indicate a MANUAL mode for entering the title numbers of the pieces of music to be reproduced in order and reproducing the pieces of music corresponding to the entered title numbers or an AUTO mode for selecting on a random basis the pieces of music recorded on the optical disk based on one of preset reproduce modes selected by the user, preparing a reproduce program indicating the reproduce order of the selected pieces of music, and reproducing the pieces of music according to the reproduce order of the prepared reproduce program, indicated MANUAL or AUTO is highlighted (in the figures, the highlight is indicated as frame display). As the user operates the determination key 20d of the remote control 20, the indicated MANUAL or AUTO mode is selected.

Figure 3B:
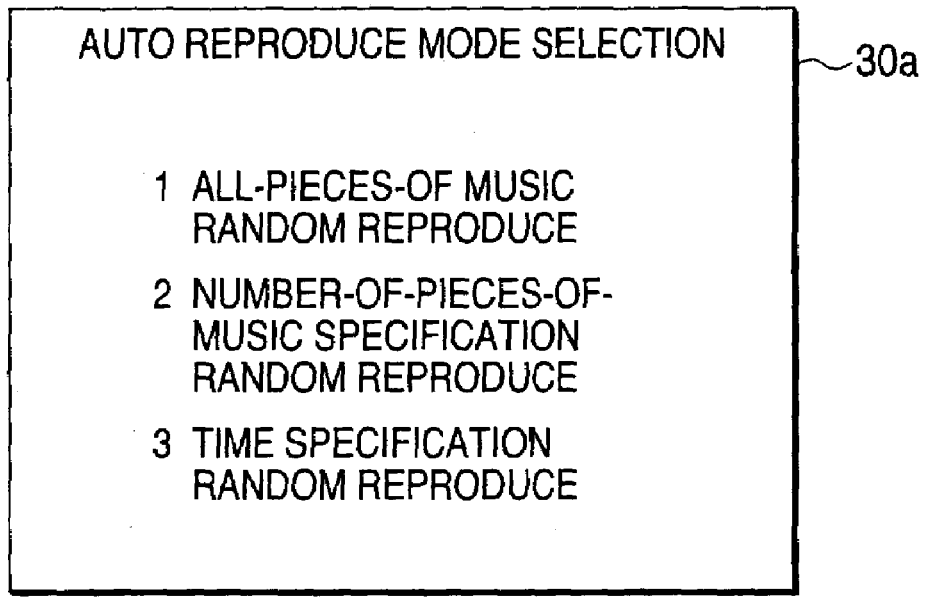

When the user selects AUTO in REPRODUCE MODE SELECTION, an AUTO REPRODUCE MODE SELECTION screen is displayed on the screen 30a of the monitor 30 as shown in FIG. 3B. The auto reproduce mode includes an ALL-PIECES-OF-MUSIC RANDOM REPRODUCE mode for selecting and reproducing all pieces of music recorded on the optical disk on a random basis, a NUMBER-OF-PIECES-OF-MUSIC SPECIFICATION RANDOM REPRODUCE mode for specifying the number of the pieces of music to be reproduced and selecting and reproducing as many pieces of music as the specified number of pieces of music on a random basis, and a TIME SPECIFICATION RANDOM REPRODUCE mode for specifying any desired reproduce time and selecting and reproducing as many pieces of music as reproduced within the specified reproduce time on a random basis. The user can operate the cursor key 20c of the remote control 20 to select one of the auto reproduce modes and operate the determination key 20d of the remote control 20, thereby selecting the desired one of the auto reproduce modes.

The operation will be discussed based on the schematic representations of FIGS. 4A to 4C to show the operation of all-piece-of-music random reproduce of the information reproducing apparatus.

Figure 4A:
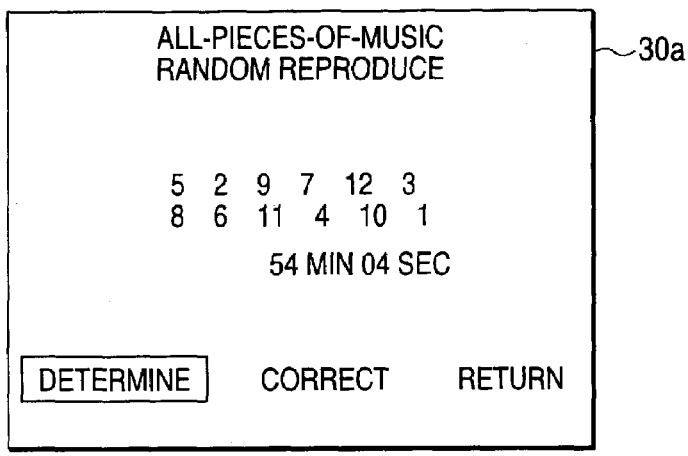
FIGS. 4A to 4C are schematic representations to show the operation of all-piece-of-music random reproduce of the information reproducing apparatus.

When the user selects the ALL-PIECES-OF-MUSIC RANDOM REPRODUCE mode in AUTO REPRODUCE MODE SELECTION, all pieces of music recorded on the optical disk are selected on a random basis without duplication on the screen 30a of the monitor 30 and the reproduce order and the reproduce time of all selected pieces of music are displayed on the screen 30a of the monitor 30, as shown in FIG. 4A.

To reproduce all pieces of music in the reproduce order displayed on the screen 30a of the monitor 30, the user can operate the determination key 20d of the remote control 20, thereby reproducing all pieces of music in the reproduce order displayed on the screen 30a of the monitor 30.

Figure 4B:
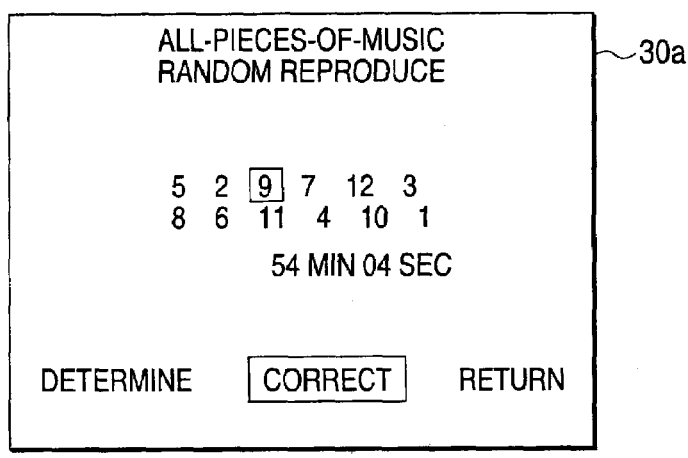
Figure 4C:
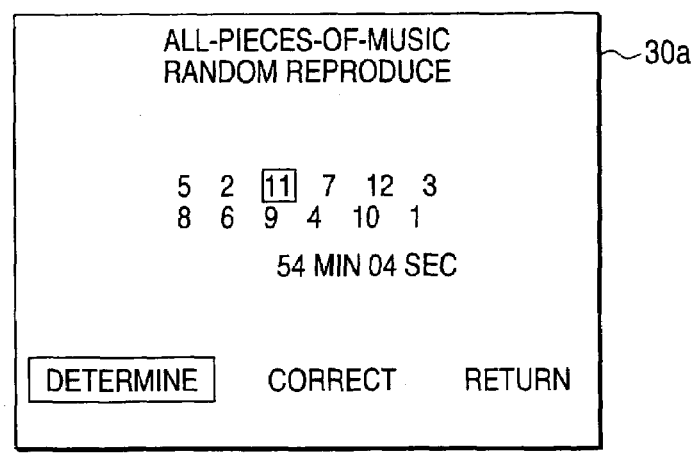

If the user operates the cursor key 20c and the determination key 20d of the remote control 20 to select CORRECT, as shown in FIG. 4B, a screen for correcting the reproduce order of the selected piece of music appears and one of the title numbers of the pieces of music is highlighted. Then, the user can operate some of the numeric ten keys 20b of the remote control 20 to enter the title number of any desired piece of music, thereby correcting the reproduce order of the pieces of music. For example, if the user operates the cursor key 20c of the remote control 20 to indicate the title number 9 of the piece of music to be changed and operates the numeric ten keys 20b of the remote control 20 to enter the title number 11 of the desired piece of music, the title number 9 of the indicated piece of music is changed to 11 and the reproduce order of the pieces of music is corrected as shown in FIG. 4C. If the user operates the determination key 20d of the remote control 20, all pieces of music are reproduced in the corrected reproduce order.

To cancel selection of the ALL-PIECES-OF-MUSIC RANDOM REPRODUCE mode, the user can operate the cursor key 20c and the determination key 20d of the remote control 20 to select RETURN, thereby returning to the AUTO REPRODUCE MODE SELECTION screen.

The operation will be discussed based on the schematic representations of FIGS. 5A to 5C to show the operation of number-of-pieces-of-music specification random reproduce of the information reproducing apparatus.

When the user selects the NUMBER-OF-PIECES-OF-MUSIC SPECIFICATION RANDOM REPRODUCE mode in AUTO REPRODUCE MODE SELECTION and operates some of the numeric ten keys 20b of the remote control 20 to enter the number of pieces of music to be reproduced, as many pieces of music as the entered number of pieces of music are selected on a random basis without duplication from among the pieces of music recorded on the optical disk and the reproduce order and the reproduce time of the selected pieces of music are displayed as shown in FIG. 5A.

To reproduce the pieces of music displayed on the screen 30a of the monitor 30 in the displayed reproduce order, the user can operate the determination key 20d of the remote control 20, thereby reproducing all pieces of music in the reproduce order displayed on the screen 30a of the monitor 30.

If the user operates the cursor key 20c and the determination key 20d of the remote control 20 to select CORRECT, as shown in FIG. 5B, a screen for correcting the selected piece of music appears and one of the title numbers of the pieces of music is highlighted. Then, the user can operate some of the numeric ten keys 20b of the remote control 20 to enter the title number of any desired piece of music, thereby changing the selected piece of music. For example, if the user operates the cursor key 20c of the remote control 20 to indicate the title number 12 of the piece of music to be corrected and operates the numeric ten key 20b of the remote control 20 to enter the title number 3 of the desired piece of music, the title number 12 of the indicated piece of music is changed to 3 and the reproduce time 27 min 21 sec is corrected to 28 min 13 sec as shown in FIG. 5C. If the user operates the determination key 20d of the remote control 20, the corrected piece of music is reproduced in the displayed reproduce order.

To cancel selection of the NUMBER-OF-PIECES-OF-MUSIC SPECIFICATION RANDOM REPRODUCE mode, the user can operate the cursor key 20c and the determination key 20d of the remote control 20 to select RETURN, thereby returning to the AUTO REPRODUCE MODE SELECTION screen.

The operation will be discussed based on the schematic representations of FIGS. 6A to 6C to show the operation of time specification random reproduce of the information reproducing apparatus.

When the user selects the TIME SPECIFICATION RANDOM REPRODUCE mode in AUTO REPRODUCE MODE SELECTION and operates some of the numeric ten keys 20b of the remote control 20 to enter any desired reproduce time, pieces of music reproduced within the specified reproduce time are selected on a random basis without duplication from among the pieces of music recorded on the optical disk and the reproduce order and the reproduce time of the selected pieces of music are displayed as shown in FIG. 6A.

To reproduce the pieces of music displayed on the screen 30a of the monitor 30 in the displayed reproduce order, the user can operate the determination key 20d of the remote control 20, thereby reproducing all pieces of music in the reproduce order displayed on the screen 30a of the monitor 30.

If the user operates the cursor key 20c and the determination key 20d of the remote control 20 to select CORRECT, as shown in FIG. 6B, a screen for correcting the selected piece of music appears and one of the title numbers of the pieces of music is highlighted. Then, the user can operate some of the numeric ten keys 20b of the remote control 20 to enter the title number of any desired piece of music, thereby changing the selected piece of music. For example, if the user operates the cursor key 20c of the remote control 20 to indicate the title number 8 of the piece of music to be corrected and operates the numeric ten keys 20b of the remote control 20 to enter the title number 10 of the desired piece of music, the title number 8 of the indicated piece of music is changed to 10 and the piece of music to be reproduced and the reproduce time are corrected as shown in FIG. 6C. If the user operates the determination key 20d of the remote control 20, the corrected piece of music is reproduced in the displayed reproduce order.

To cancel selection of the TIME SPECIFICATION RANDOM REPRODUCE mode, the user can operate the cursor key 20c and the determination key 20d of the remote control 20 to select RETURN, thereby returning to the AUTO REPRODUCE MODE SELECTION screen.

Further, the operation will be discussed with reference to the flowcharts of FIGS. 7 to 10 to show the operation of the information reproducing apparatus.

To begin with, the operation will be discussed based on the flowchart of FIG. 7 to show the operation of reproduce mode selection of the information reproducing apparatus.

When the user selects REPRODUCE MODE SELECTION on the menu screen, control goes from step S1 to S2 and whether or not the user selects the AUTO mode for selecting the pieces of music recorded on the optical disk on a random basis and reproducing the selected pieces of music is determined. If the user selects the AUTO mode, control goes to step S5; if the user does not select the AUTO mode, control goes to step S3.

At step S3, when the user enters the title numbers of the pieces of music to be reproduced in order, control goes to step S4.

At step S4, the pieces of music corresponding to the entered title numbers are reproduced in order and control goes to step S10 and returns to a main program (not shown).

At step S5, which of the auto reproduce modes is selected is determined. If the user selects the ALL-PIECES-OF-MUSIC RANDOM REPRODUCE model, control goes to step 6; if the user selects the NUMBER-OF-PIECES-OF-MUSIC SPECIFICATION RANDOM REPRODUCE mode, control goes to step S7; or if the user selects the TIME SPECIFICATION RANDOM REPRODUCE mode, control goes to step S8.

At step S6, a processing program of the ALL-PIECES-OF-MUSIC RANDOM REPRODUCE mode for selecting and reproducing all pieces of music recorded on the optical disk on a random basis is executed and control goes to step S9.

At step S7, a processing program of the NUMBER-OF-PIECES-OF-MUSIC SPECIFICATION RANDOM REPRODUCE mode for specifying the number of the pieces of music to be reproduced and selecting and reproducing as many pieces of music as the specified number of pieces of music on a random basis is executed and control goes to step S9.

At step S8, a processing program of the TIME SPECIFICATION RANDOM REPRODUCE mode for specifying any desired reproduce time and selecting and reproducing as many pieces of music as reproduced within the specified reproduce time on a random basis is executed and control goes to step S9.

At step S9, whether or not the user selects RETURN in processing of the ALL-PIECES-OF-MUSIC RANDOM REPRODUCE, NUMBER-OF-PIECES-OF-MUSIC SPECIFICATION RANDOM REPRODUCE, or TIME SPECIFICATION RANDOM REPRODUCE mode processing program is determined. If the user selects RETURN, control returns to step S5; if the user does not select RETURN, control goes to step S10 and returns to the main program.

Figure 8:
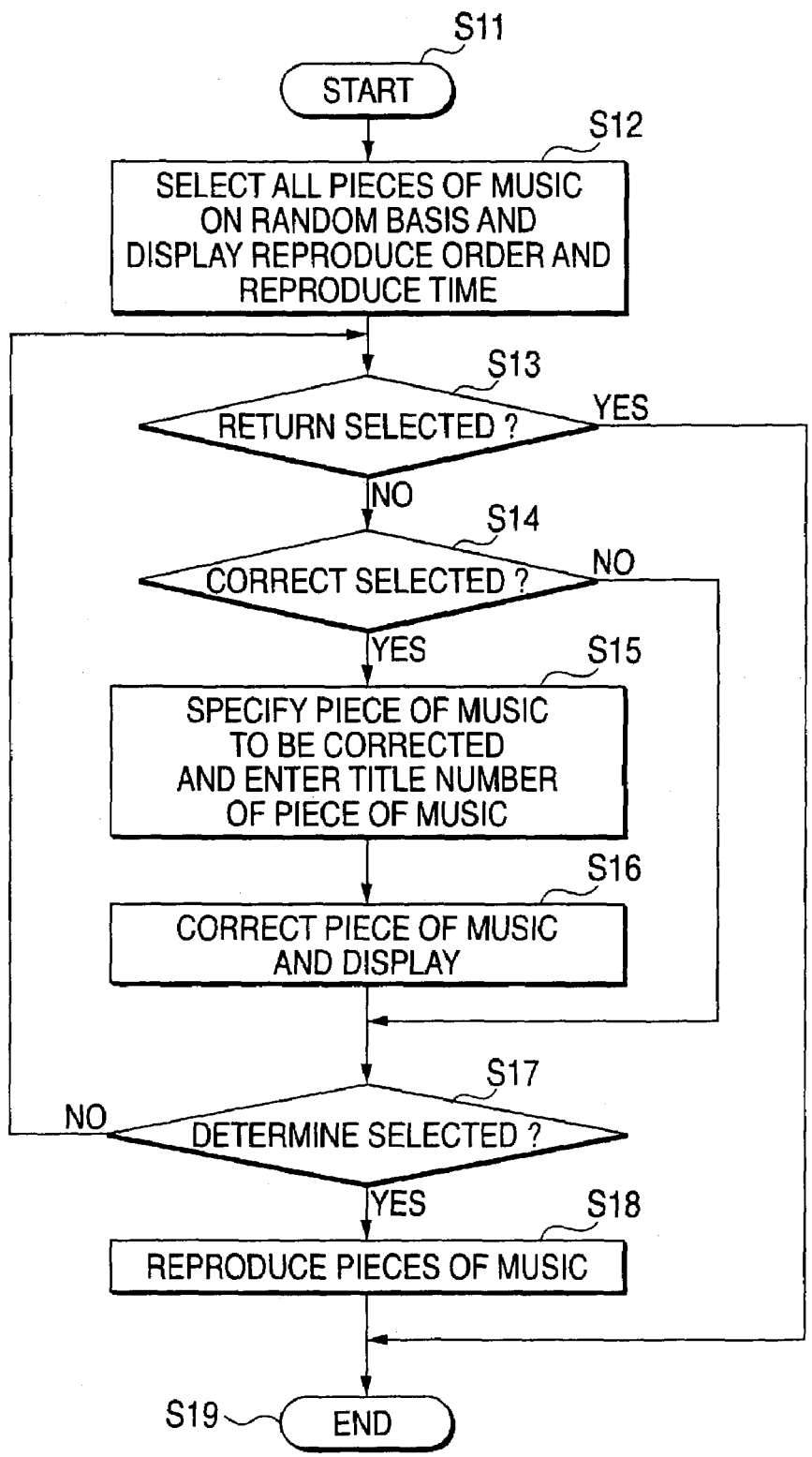
FIG. 8 is a flowchart to show the operation of all-piece-of-music random reproduce of the information reproducing apparatus.

The operation will be discussed based on the flowchart of FIG. 8 to show the operation of all-pieces-of-music random reproduce of the information reproducing apparatus.

When the user selects the ALL-PIECES-OF-MUSIC RANDOM REPRODUCE mode of the auto reproduce mode, control goes from step S11 to step S12, all pieces of music recorded on the optical disk are selected on a radon basis without duplication, the reproduce order and the reproduce time of all pieces of music selected are displayed on the screen of the monitor, and control goes to step S13.

At step S13, whether or not the user selects RETURN for stopping processing of the ALL-PIECES-OF-MUSIC RANDOM REPRODUCE mode and returning to REPRODUCE MODE SELECTION is determined. If the user selects RETURN, control goes to step S18, the processing is terminated, and control returns to the processing program of REPRODUCE MODE SELECTION (see FIG. 7); if the user does not select RETURN, control goes to step S14.

At step S14, whether or not the user selects CORRECT for correcting the reproduce order of the selected piece of music is determined. If the user selects CORRECT, control goes to step S15; if the user does not select CORRECT, control goes to step S17.

At step S15, when the user operates the cursor key to specify the piece of music to be corrected and operates the numeric ten key to enter the title number of any desired piece of music, control goes to step S16.

At step S16, the specified piece of music is corrected to the piece of music corresponding to the entered title number, the reproduce order of all pieces of music is displayed on the screen of the monitor, and control goes to step S17.

At step S17, whether or not the user selects DETERMINE for reproducing all pieces of music in the selected or corrected reproduce order is determined. If the user selects DETERMINE, control goes to step S18; if the user does not select DETERMINE, control returns to step S13 and steps S13 to S17 are repeated.

Figure 7:
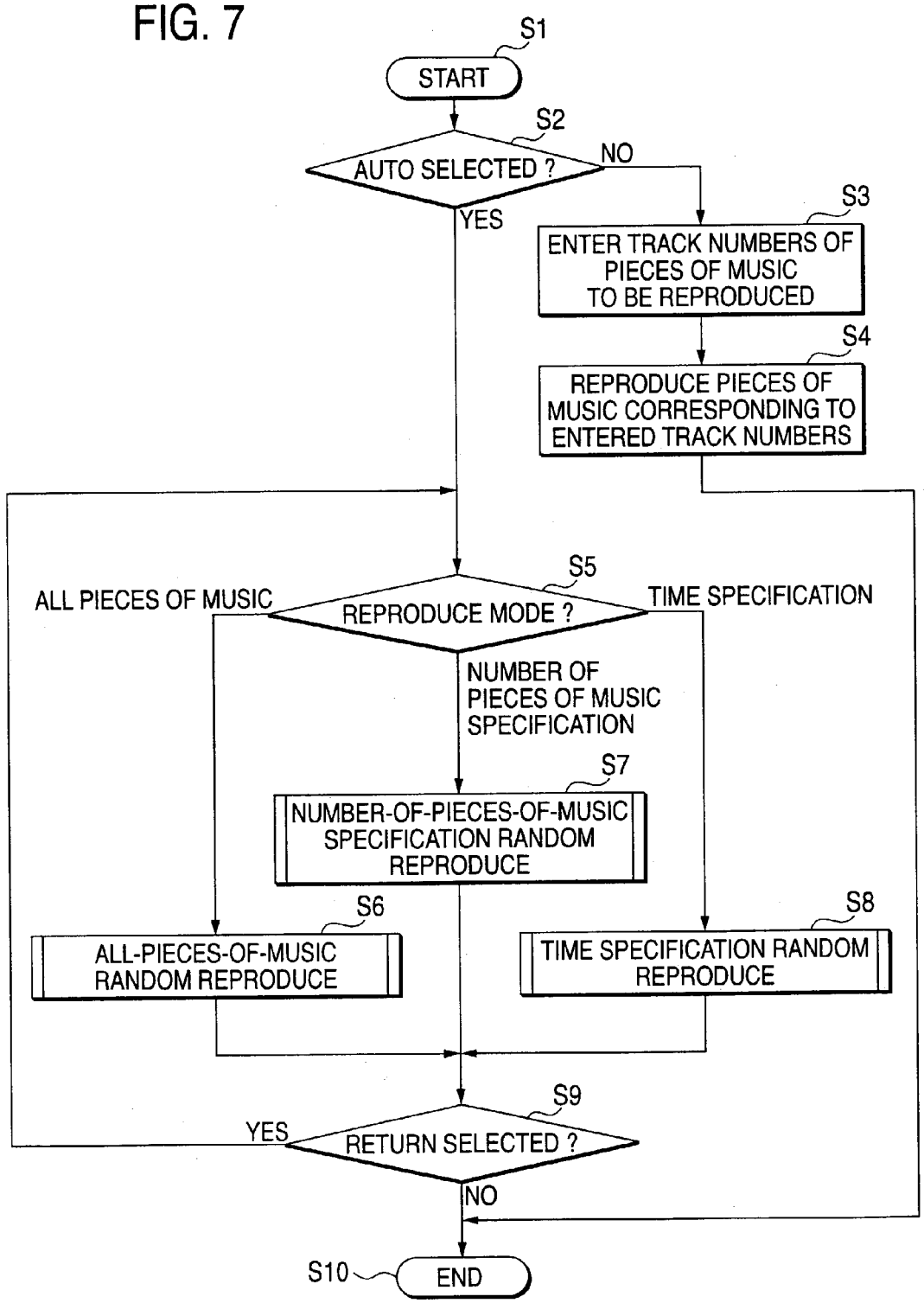
FIG. 7 is a flowchart to show the operation of reproduce mode selection of the information reproducing apparatus.

At step S18, all pieces of music are reproduced in the selected or corrected reproduce order, control goes to step S19, the processing is terminated, and control returns to the processing program of REPRODUCE MODE SELECTION (see FIG. 7).

Figure 9:
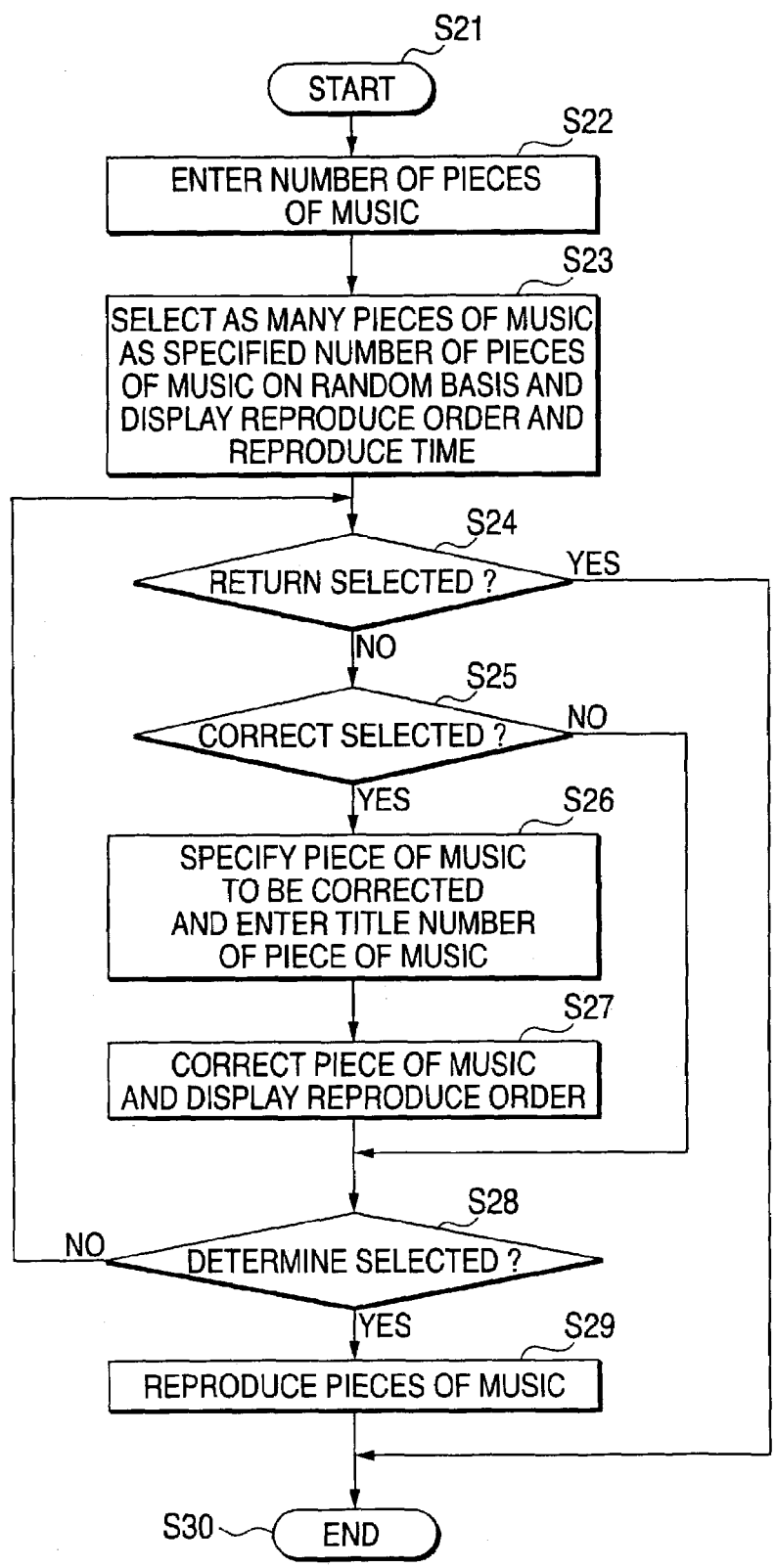
FIG. 9 is a flowchart to show the operation of number-of-pieces-of-music specification random reproduce of the information reproducing apparatus.

Next, the operation will be discussed based on the flowchart of FIG. 9 to show the operation of number-of-pieces-of-music specification random reproduce of the information reproducing apparatus.

When the user selects the NUMBER-OF-PIECES-OF-MUSIC SPECIFICATION RANDOM REPRODUCE mode of the auto reproduce mode, control goes from step S21 to step S22 and when the user enters the number of pieces of music to be reproduced, control goes to step S23.

At step S23, as many pieces of music as the entered number of pieces of music are selected on a random basis without duplication from among the pieces of music recorded on the optical disk, the reproduce order and the reproduce time of the selected pieces of music are displayed on the screen of the monitor, and control goes to step S24.

At step S24, whether or not the user selects RETURN for stopping processing of the NUMBER-OF-PIECES-OF-MUSIC SPECIFICATION RANDOM REPRODUCE mode and returning to REPRODUCE MODE SELECTION is determined. If the user selects RETURN, control goes to step S30, the processing is terminated, and control returns to the processing program of REPRODUCE MODE SELECTION (see FIG. 7); if the user does not select RETURN, control goes to step S25.

At step S25, whether or not the user selects CORRECT for correcting the title number of the selected piece of music is determined. If the user selects CORRECT, control goes to step S26; if the user does not select CORRECT, control goes to step S28.

At step S26, the title number of the piece of music whose reproduce order is to be corrected is entered, the reproduce order of the selected piece of music is corrected, and control goes to step S27.

At step S27, the reproduce time is corrected and is displayed on the screen of the monitor, and control goes to step S25.

At step S28, whether or not the user selects DETERMINE for reproducing all pieces of music in the selected or corrected reproduce order is determined. If the user selects DETERMINE, control goes to step S29; if the user does not select DETERMINE, control returns to step S24 and steps S24 to S28 are repeated.

At step S29, all pieces of music are reproduced in the selected or corrected reproduce order, control goes to step S30, the processing is terminated, and control returns to the processing program of REPRODUCE MODE SELECTION (see FIG. 7).

Figure 10:
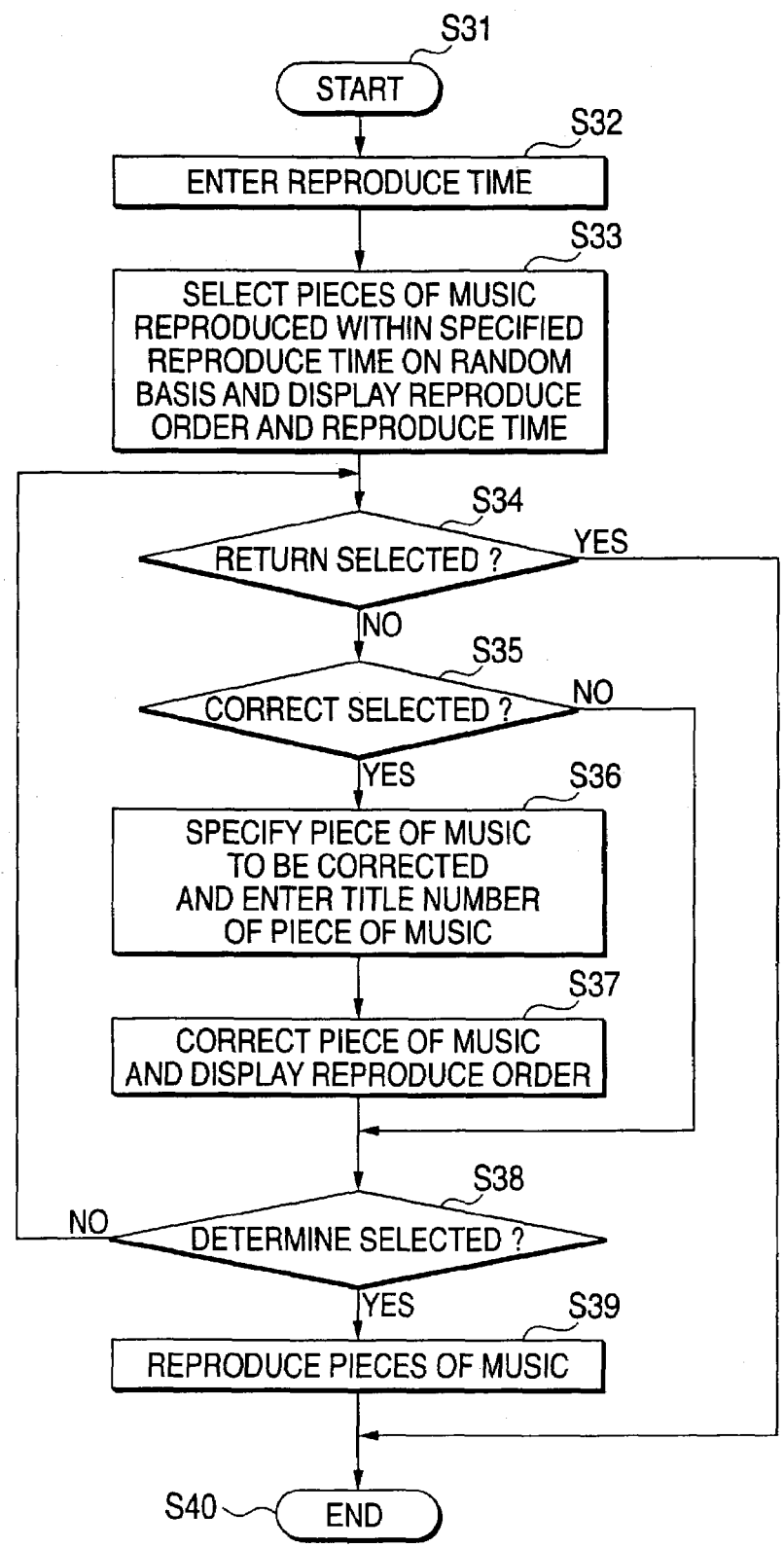
FIG. 10 is a flowchart to show the operation of time specification random reproduce of the information reproducing apparatus.

Next, the operation will be discussed based on the flowchart of FIG. 10 to show the operation of time specification random reproduce of the information reproducing apparatus.

When the user selects the TIME SPECIFICATION RANDOM REPRODUCE mode of the auto reproduce mode, control goes from step S31 to step S32 and when the user specifies any desired reproduce time, control goes to step S33.

At step S33, pieces of music reproduced within the specified reproduce time are selected on a random basis without duplication from among the pieces of music recorded on the optical disk, the reproduce order and the reproduce time of the selected pieces of music are displayed on the screen of the monitor, and control goes to step S34.

At step S34, whether or not the user selects RETURN for stopping processing of the TIME SPECIFICATION RANDOM REPRODUCE mode and returning to REPRODUCE MODE SELECTION is determined. If the user selects RETURN, control goes to step S40, the processing is terminated, and control returns to the processing program of REPRODUCE MODE SELECTION (see FIG. 7); if the user does not select RETURN, control goes to step S35.

At step S35, whether or not the user selects CORRECT for correcting the title number of the selected piece of music is determined. If the user selects CORRECT, control goes to step S36; if the user does not select CORRECT, control goes to step S38.

At step S36, the title number of the piece of music whose reproduce order is to be corrected is entered, the reproduce order of the selected piece of music is corrected, and control goes to step S37.

At step S37, the reproduce time is corrected and is displayed on the screen of the monitor, and control goes to step S38.

At step S38, whether or not the user selects DETERMINE for reproducing all pieces of music in the selected or corrected reproduce order is determined. If the user selects DETERMINE, control goes to step S39; if the user does not select DETERMINE, control returns to step S34 and steps S34 to S38 are repeated.

At step S39, all pieces of music are reproduced in the selected or corrected reproduce order, control goes to step S40, the processing is terminated, and control returns to the processing program of REPRODUCE MODE SELECTION (see FIG. 7)

The embodiment of the invention has been described in detail, but the invention is not limited to the specific embodiment and can be applied to reproduce of various pieces of information recorded on an optical disk. For example, the invention can also be applied to reproduce of video information recorded on an optical disk.

In the description given above, the selected piece of music is indicated for correction. The title number of a piece of music that is not recorded on an optical disk such as "0" may be entered, whereby the selected piece of music may be indicated for deletion.

To select the pieces of music recorded on an optical disk on a random basis without duplication, the title numbers of pieces of music may be selected according to random numbers and selection of music may be repeated so that the selected pieces of music do not become duplicate.

As described above, according to the information reproducing apparatus of the invention, the reproduce mode of selecting and reproducing all pieces of information recorded on the record medium, the reproduce mode of specifying the number of pieces of information to be reproduced, selecting as many pieces of information as the specified number of pieces of information from among the pieces of information recorded on the record medium, and reproducing the pieces of information, or the reproduce mode of specifying reproduce time to reproduce information, selecting pieces of information reproduced within the specified reproduce time from among the pieces of information recorded on the record medium, and reproducing the pieces of information can be selected, a reproduce program for selecting pieces of information recorded on the record medium on a random basis without duplication based on the selected reproduce mode and indicating the reproduce order of the selected pieces of information can be prepared, and the pieces of information recorded on the record medium can be reproduced according to the reproduce order of the prepared reproduce program. The prepared reproduce program can be displayed on the screen of the monitor, information displayed on the screen of the monitor can be indicated, and selected information can be corrected for correcting the prepared reproduce program. Accordingly, based on the reproduce mode selected by the user, the pieces of information recorded on the record medium can be automatically selected for reproduce.

The information reproducing apparatus of the first aspect selects a reproduce mode of selecting and reproducing all pieces of information recorded on the record medium, a reproduce mode of specifying the number of pieces of information to be reproduced, selecting as many pieces of information as the specified number of pieces of information from among the pieces of information recorded on the record medium, and reproducing the pieces of information, or a reproduce mode of specifying reproduce time to reproduce information, selecting pieces of information reproduced within the specified reproduce time from among the pieces of information recorded on the record medium, and reproducing the pieces of information, prepares a reproduce program for selecting pieces of information recorded on the record medium on a random basis without duplication based on the selected reproduce mode and indicating the reproduce order of the selected pieces of information, displays the prepared reproduce program on a screen of a monitor, indicates information of the reproduce program displayed on the screen of the monitor, corrects selected information, and plays back the pieces of information recorded on the record medium according to the reproduce order of the prepared or corrected reproduce program.

The information reproducing apparatus of the second aspect selects one of preset reproduce modes, prepares a reproduce program for selecting pieces of information recorded on the record medium on a random basis without duplication based on the selected reproduce mode and indicating the reproduce order of the selected pieces of information, and plays back the pieces of information recorded on the record medium according to the reproduce order of the prepared reproduce program.

The information reproducing apparatus of the third aspect can display the prepared reproduce program on the screen of the monitor, indicate information of the reproduce program displayed on the screen of the monitor, and correct the prepared reproduce program.

The information reproducing apparatus of the fourth aspect selects all pieces of information recorded on the record medium on a random basis without duplication and plays back all pieces of information selected.

The information reproducing apparatus of the fifth aspect specifies the number of pieces of information to be reproduced, selects as many pieces of information as the specified number of pieces of information on a random basis without duplication from among the pieces of information recorded on the record medium, and plays back the pieces of information selected.

The information reproducing apparatus of the sixth aspect specifies reproduce time to reproduce information, selects pieces of information reproduced within the specified reproduce time on a random basis without duplication from among the pieces of information recorded on the record medium, and plays back the pieces of information selected.

What is claimed is:

1. An information reproducing apparatus for reproducing information recorded on a record medium, the information reproducing apparatus comprising:

reproduce mode selection means for selecting one of a plurality of selection modes; the modes including a reproduce mode of selecting and reproducing all pieces of information recorded on the record medium, a reproduce mode of specifying the number of pieces of information to be reproduced, selecting as many pieces of information as the specified number of pieces of information from among the pieces of information recorded on the record medium, and reproducing the pieces of information, and a reproduce mode of specifying reproduce time to reproduce information, selecting pieces of information reproduced within the specified reproduce time from among the pieces of information recorded on the record medium, and reproducing the pieces of information;

reproduce program preparation means for preparing a reproduce program for selecting pieces of information recorded on the record medium on a random basis without duplication based on the reproduce mode selected through the reproduce mode selection means and indicating the reproduce order of the selected pieces of information;

display means for displaying the reproduce program prepared by the reproduce program preparation means on a screen of a monitor;

reproduce program correction means for indicating information of the reproduce program displayed on the screen of the monitor by the display means and correcting information selected by the reproduce program preparation means for correcting the reproduce program prepared by the reproduce program preparation means; and reproduce means for reproducing the pieces of information recorded on the record medium according to the reproduce order of the reproduce program prepared by the reproduce program preparation means and corrected through the reproduce program correction means.

2. An information reproducing apparatus for reproducing information recorded on a record medium, the information reproducing apparatus comprising:

reproduce mode selection means for selecting one of preset reproduce modes, wherein the preset reproduce modes include a reproduce mode of specifying reproduce time to reproduce information, selecting pieces of information reproduced within the specified reproduce time from among the pieces of information recorded on the record medium, and reproducing the pieces of information;

reproduce program preparation means for preparing a reproduce program for selecting pieces of information recorded on the record medium on a random basis without duplication based on the reproduce mode selected through the reproduce mode selection means and indicating the reproduce order of the selected pieces of information; and reproduce means for reproducing the pieces of information recorded on the record medium according to the reproduce order of the reproduce program prepared by the reproduce program preparation means.

3. The information reproducing apparatus as claimed in claim 2, further comprising:

display means for displaying the reproduce program prepared by the reproduce program preparation means on a screen of a monitor; and reproduce program correction means for indicating information of the reproduce program displayed on the screen of the monitor by the display means and correcting information selected by the reproduce program preparation means for correcting the reproduce program prepared by the reproduce program preparation means.

4. The information reproducing apparatus as claimed in claim 2, wherein the reproduce mode selection means selects a reproduce mode of selecting and reproducing all pieces of information recorded on the record medium.

* * * * *